(12) United States Patent
Lomnitz

(10) Patent No.: US 8,934,422 B2
(45) Date of Patent: *Jan. 13, 2015

(54) DOWNLINK SUBCHANNELIZATION SCHEME FOR 802.16M

(75) Inventor: Yuval Lomnitz, Herzlia (IL)

(73) Assignee: Intel Corporation, Santa Clara, CA (US)

( * ) Notice: Subject to any disclaimer, the term of this patent is extended or adjusted under 35 U.S.C. 154(b) by 835 days.

This patent is subject to a terminal disclaimer.

(21) Appl. No.: 13/163,456

(22) Filed: Jun. 17, 2011

(65) Prior Publication Data

US 2012/0320836 A1  Dec. 20, 2012

Related U.S. Application Data

(63) Continuation of application No. 12/344,498, filed on Dec. 27, 2008, now Pat. No. 7,986,613.

(51) Int. Cl.
*H04L 12/26* (2006.01)
*H04L 5/00* (2006.01)
*H04W 16/00* (2009.01)
*H04W 72/04* (2009.01)
*H04L 27/26* (2006.01)

(52) U.S. Cl.
CPC ............ *H04L 5/0028* (2013.01); *H04W 16/00* (2013.01); *H04W 72/04* (2013.01); *H04L 5/0007* (2013.01); *H04L 5/0023* (2013.01); *H04L 5/0039* (2013.01); *H04L 5/0044* (2013.01); *H04L 5/0048* (2013.01); *H04L 5/0064* (2013.01); *H04L 27/2604* (2013.01)
USPC ........................................................ 370/329

(58) Field of Classification Search
CPC ..... H04L 5/0007; H04W 72/04; H04W 16/00
USPC ........................................................ 370/329
See application file for complete search history.

(56) References Cited

U.S. PATENT DOCUMENTS

| | | | |
|---|---|---|---|
| 7,574,179 | B2 | 8/2009 | Barak et al. |
| 2009/0047969 | A1 | 2/2009 | Lee et al. |
| 2009/0059859 | A1 | 3/2009 | Kuze et al. |
| 2009/0061778 | A1 | 3/2009 | Vrzic et al. |
| 2009/0092086 | A1 | 4/2009 | Lee et al. |
| 2009/0245197 | A1 | 10/2009 | Ma et al. |
| 2010/0166087 | A1 | 7/2010 | Lomnitz |
| 2010/0322109 | A1 | 12/2010 | Ahn et al. |
| 2013/0258987 | A1* | 10/2013 | Chun et al. ................ 370/329 |
| 2013/0308584 | A1* | 11/2013 | Lee et al. ................ 370/329 |

* cited by examiner

*Primary Examiner* — Mark Rinehart
*Assistant Examiner* — Matthew Hopkins
(74) *Attorney, Agent, or Firm* — Carrie A. Boone, P.C.

(57) ABSTRACT

Two novel subchannelization methods are disclosed, for use in a 802.16m system. A downlink subchannelization method supports both localized and distributed sub-carriers, different modulation modes, and supports a variety of different fractional frequency reuse (FFR) partition allocations.

17 Claims, 5 Drawing Sheets

DOWNLINK SUBCHANNELIZATION SCHEME FOR 802.16M

CROSS-REFERENCE TO RELATED APPLICATIONS

This application claims priority to U.S. Pat. No. 7,986,613, issued on Jul. 26, 2011.

TECHNICAL FIELD

This application relates to worldwide interoperability for microwave access (WiMAX) and, more particularly, to a subchannelization scheme to be used in the 802.16m standard.

BACKGROUND

WiMAX, or WiMAX-I, is based on the IEEE (Institute of Electrical and Electronics Engineers) 802.16e standard. WiMAX-I employs orthogonal frequency division multiple access (OFDMA) for transmissions, resulting in improved multi-path performance in non-line-of-sight environments. WiMAX-I may employ single-user (SU) or multiple-user (MU) multiple-input multiple output (MIMO) antenna techniques, adaptive modulation and coding schemes, and flexible subchannelization. A new generation of WiMAX termed 802.16m is currently under development.

Under fixed WiMAX, a limited form of subchannelization is supported in the uplink only. Mobile WiMAX permits subchannelization in both the uplink and the downlink. Currently, there exist multiple subchannelization schemes for dividing frequency/time resources between users. Partially used sub-channel (PUSC), fully used sub-channel (FUSC), and adaptive modulation and coding (AMC) are three subchannelization schemes that may be used for mobile WiMAX.

An OFDMA symbol is made up of sub-carriers, divided into data sub-carriers, pilot sub-carriers, and null sub-carriers (e.g., guard band). Subchannelization schemes divide the available sub-carriers into groups called logical resource units (LRUs). The LRUs may include contiguous sub-carriers (localized) or sub-carriers that are more random in their distribution (distributed).

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a novel subchannelization method is disclosed, for use in an 802.16m system. The subchannelization method, used for downlink transmissions, supports both localized and distributed LRUs, different modulation modes, and supports a variety of different fractional frequency reuse (FFR) partition allocations.

Figure 1:
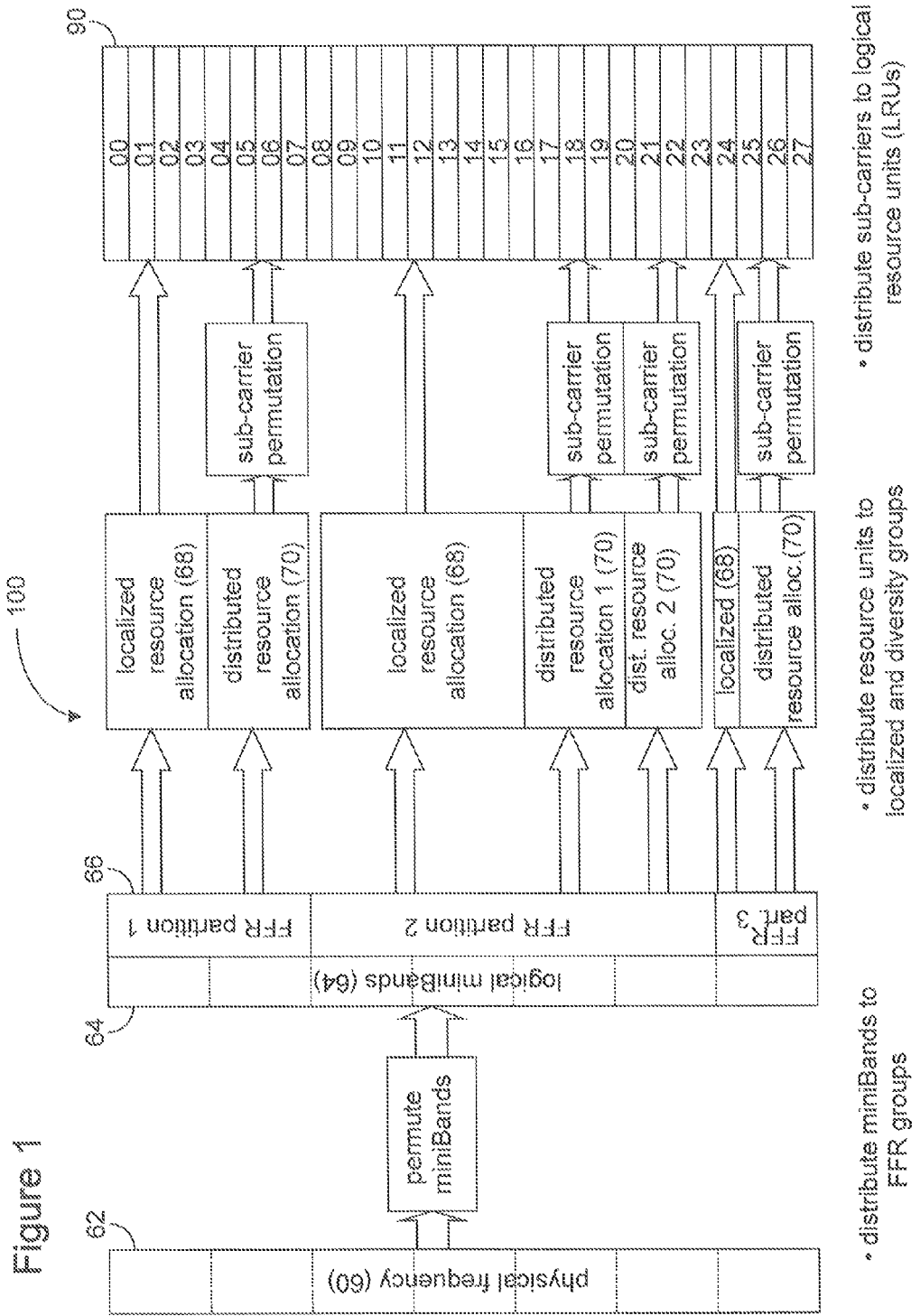
FIG. 1 is a block diagram of a downlink subchannelization method, according to some embodiments.

FIG. 1 is a schematic block diagram of a downlink subchannelization method 100, according to some embodiments. The downlink subchannelization method 100 divides a physical frequency allotment 60, or allocated bandwidth, into multiple LRUs 90, as described below.

Figure 2:
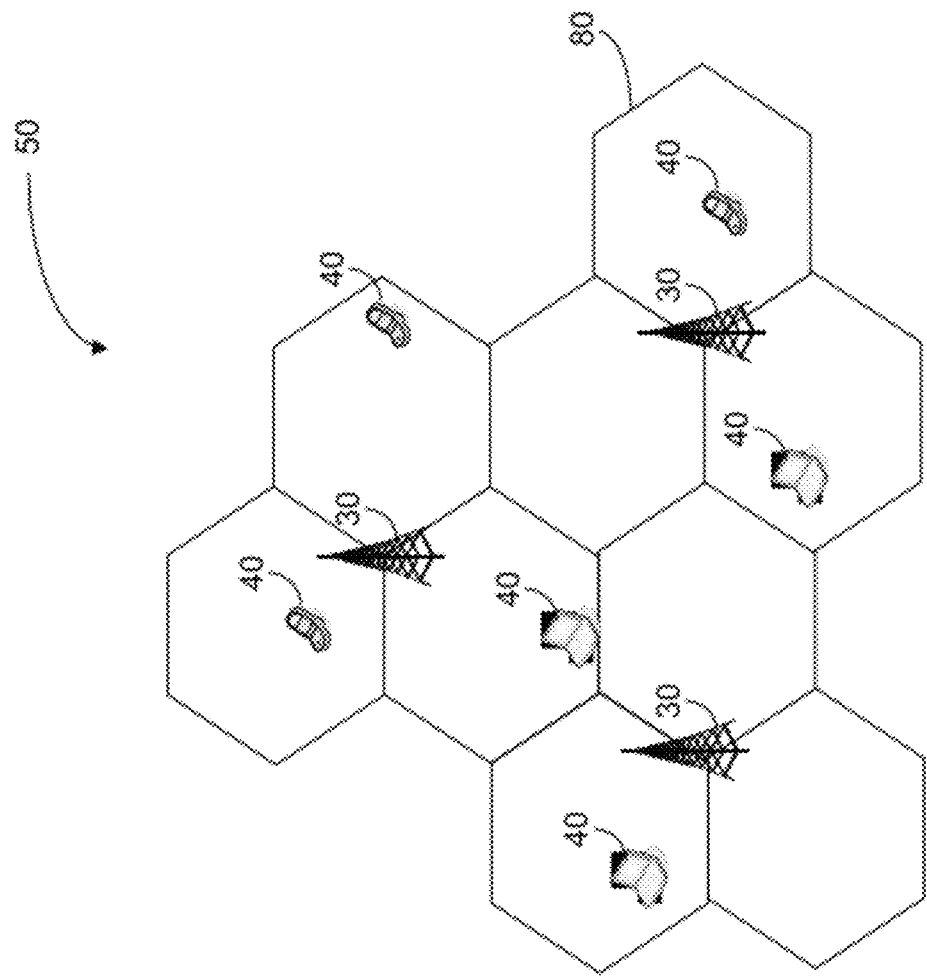
FIG. 2 is a block diagram of a cellular neighborhood that uses the subchannelization methods of FIG. 1, according to some embodiments.
Figure 3:
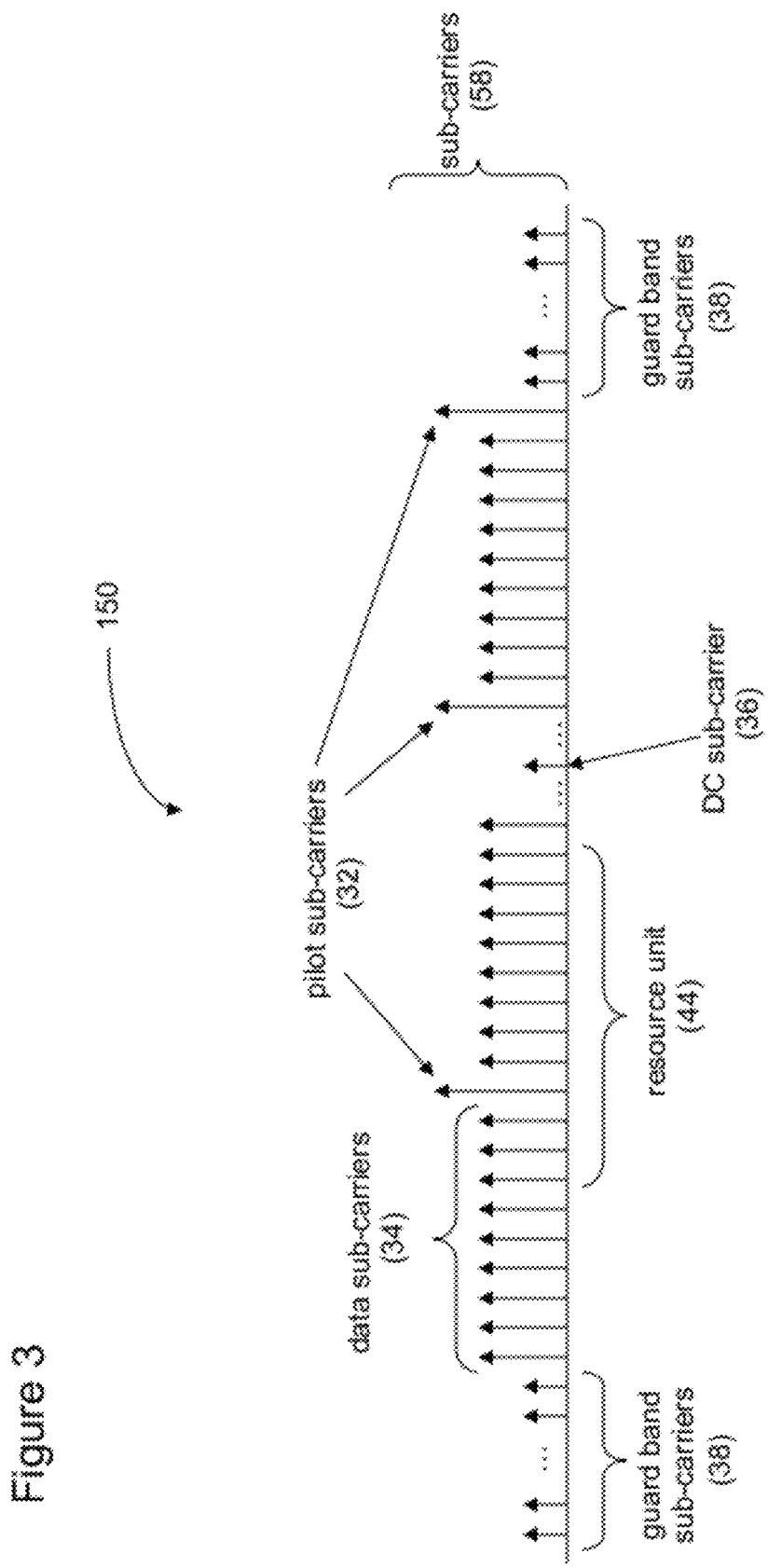
FIG. 3 is a schematic block diagram of an OFDMA sub-carrier structure including resource units used by the subchannelization method of FIG. 1, according to some embodiments.
Figure 4:
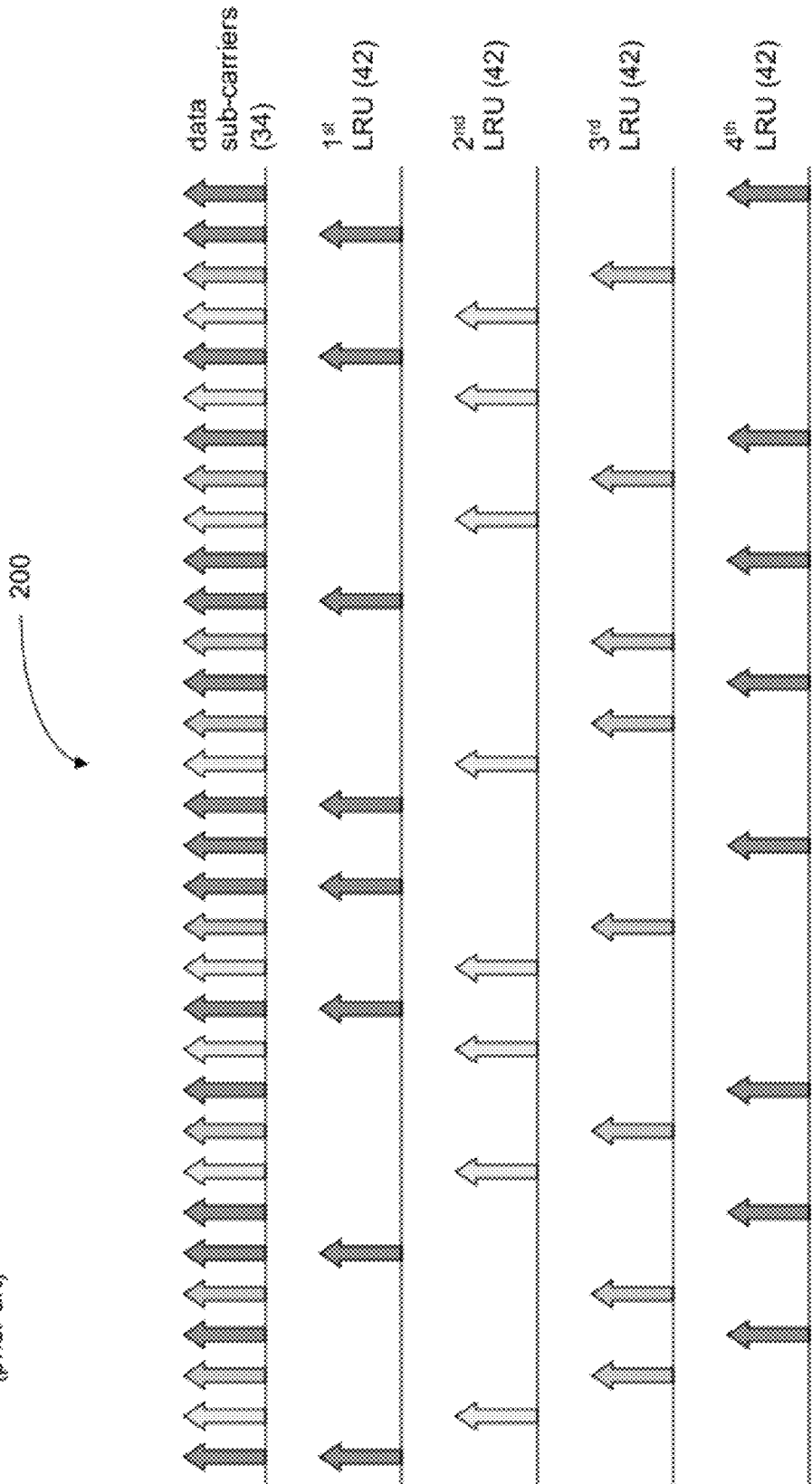
FIG. 4 is a block diagram of a simple subchannelization scheme, according to the prior art.

Before further describing the downlink subchannelization method 100, the environment in which the method may be used is illustrated in FIGS. 2, 3, and 4. FIG. 2 is a block diagram of a cellular neighborhood 50, including advanced base stations (ABSs) 30 each supporting three surrounding sectors or cells 80. The sectors 80 are roughly hexagonal in shape, but may be differently shaped, depending on the environment supported by the ABS 30, including the terrain, presence of buildings, water, and so on. Advanced mobile stations (AMSs) 40 occupy the sectors 80 and each AMS communicates with its serving ABS 30. Communication from an AMS 40 to its serving ABS 30 is an uplink transmission; communication from a serving ABS 30 to the one or more AMSs 40 supported by the ABS is a downlink transmission.

FIG. 3 is a schematic block diagram of an OFDMA sub-carrier structure 150, according to some embodiments. The sub-carrier structure 150 includes sub-carriers 58, including pilot sub-carriers 32, used for estimation and synchronization, data sub-carriers 34, used for data transmission, and null sub-carriers, including a DC sub-carrier 36 and guard band sub-carriers 38, which are not used for transmissions. The data sub-carriers 36 may be divided into groups known herein as LRUs 90. Ellipses indicate that the OFDMA symbol may have many more sub-carriers 58 than are indicated in FIG. 3.

FIG. 4 depicts a simple subchannelization scheme 200, according to the prior art. At the top of the scheme 200 are thirty-two data sub-carriers 34, color-coded in four colors: red, yellow, green, and blue. The data sub-carriers 34 are divided into four groups of LRUs 42, with each LRU having eight data sub-carriers 34 of the same color. AMSs 40 are allocated LRUs 42 by their serving ABS 30 according to many different schemes, such as fractional frequency reuse. In the prior art scheme of FIG. 4, the LRUs 42 include only data sub-carriers 34, but do not include pilot sub-carriers 32.

In contrast to some prior art subchannelization methods, the LRUs 90 (FIG. 1) of the subchannelization method 100 include pilot sub-carriers 32 as well as data sub-carriers 34. As used herein, a resource unit 44 is defined as a minimal unit of sub-carriers 58, including at least one dedicated pilot sub-carrier 32 and one or more data sub-carriers 34. For example, a resource unit 44 is depicted in FIG. 3, and has one pilot sub-carrier 32 and eleven data sub-carriers 34. In some embodiments, the resource unit 44 has dimensions of 18×6, eighteen sub-carriers by six symbols, with 48 resource units occupying a 1024-sized fast Fourier transform (FFT).

Downlink Subchannelization

The subchannelization method 100 for downlink transmissions is described in detail, below, in view of the features defined in FIGS. 2, 3, and 4 and the above definitions. In addition to the illustrations, the process of downlink subchannelization method 100 includes three steps, indicated at the bottom of FIG. 1:

distribute miniBands to FFR partitions
    distribute resource units to localized resource allocations and distributed resource allocations
    distribute sub-carriers 58 to LRUs 90

These three steps are described in more detail, below.

Where the same sub-carriers are in the same time slots within nearby cells 80, collisions (interference) may occur. Under WiMAX, the same frequency band may be used in other, usually non-adjacent cells 80. This principle is known as fractional frequency reuse (FFR). Under FFR, AMSs 40 located at the edge of the cell 80 are distinguished from AMSs located at the cell center. As one example, cell edge AMSs may operate with a fraction of the available LRUs (known as frequency reuse 3) while the cell center subscribers operate with all available LRUs (known as frequency reuse 1). FFR partitions 1, 2, and 3 in FIG. 1 represent these user allocations. The subchannelization method 100 is designed with these FFR principles in mind.

As depicted in FIG. 1, the downlink subchannelization method 100 first partitions the bandwidth (physical frequency 60) into FFR partitions 66, in the following steps. First, the physical frequency allotment 60 is divided into miniBands 62. An m-resource unit miniBand is defined as a minimal portion of adjacent physical resource units (PRUs) that will be allocated to a single FFR partition. If, for example, m is two, then each miniBand includes two resource units 44. Next, the physical miniBands 62 are divided into logical miniBands 64, which are then distributed to the FFR partitions 66. The logical miniBands 64 may be arranged in a different order than the physical miniBands 62, before being allocated to the FFR partitions 66.

In some embodiments, the size of m may vary, both between FFR partitions 66 and within an FFR partition. This may be done in order to maximize diversity for distributed LRUs 90 while maintaining large continuous miniBands for localized LRUs. A possible way to vary m is to first permute units of $m_1$ (e.g. $m_1=4$) resource units 44. Then, some of the units are allocated as miniBands, and some of them are further permuted in units of $m_2$ resource units, where $m_2$ is less than $m_1$ (e.g. $m_2=1$), and then allocated as miniBands. The result of this process is that some miniBands are of size $m_1$ and some are of size $m_2$.

In some embodiments, the ABS 30 defines the number and size (in miniBands 64) of each FFR partition 66, known herein as the FFR partition list 90. A semi-static process, the ABS 30 may broadcast the FFR partition list 90 to the AMS(s) 40 using the broadcast control channel (BCCH), as one example. In FIG. 1, there are three FFR partitions 66, FFR partition 1, FFR partition 2, and FFR partition 3. Table 1 is a sample FFR partition list 90 for the FFR partitions 66 of FIG. 1.

TABLE 1

| FFR partition list 90 | | |
|---|---|---|
| | m | partition |
| FFR partition 1: | | |
| 4-resource unit miniBand | 4 | localized resource allocation |
| 1-resource unit miniBand | 1 | distributed resource allocation |

TABLE 1-continued

| FFR partition list 90 | | |
|---|---|---|
| | m | partition |
| FFR partition 2: | | |
| 8-resource unit miniBand | 8 | localized resource allocation |
| 1-resource unit miniBand | 1 | distributed resource allocation 1 |
| 1-resource unit miniBand | 1 | distributed resource allocation 2 |
| FFR partition 3: | | |
| 4-resource unit miniBand | 4 | localized resource allocation |
| 1-resource unit miniBand | 1 | distributed resource allocation |

The FFR partitions 1 and 3 each have two groups, a localized resource allocation 68 and a distributed resource allocation 70, with the localized resource allocation getting the larger miniBand. The FFR group 2 66 has three groups, two distributed resource allocations 70 and one localized resource allocation, with the localized resource allocation getting the largest miniBand.

In some embodiments, the FFR group list 90 is coordinated between cells 80 of the cellular network 50, although the list is not necessarily identical to each cell. According to the FFR group list 90, miniBands are mapped to FFR groups 66 in a static way (renumbered and then mapped). In some embodiments, the renumbering (permutation) sequence is the same in all cells 80, with the goal to achieve maximum spreading. In some embodiments, the FFR partitions 66 are orthogonal.

Once the logical miniBands 64 have been assigned to an FFR partition 66, the FFR partitions 66 are further sub-divided according to whether the resource units 44 are used for contiguous or distributed LRUs 90. Recall that, under subchannelization, the LRUs 42 may include contiguous sub-carriers (localized) or randomly distributed sub-carriers (distributed). When contiguous, the LRUs 90 are known as localized LRUs 68. When (pseudo-randomly) distributed, the LRUs 90 are known as distributed LRUs, and are grouped in distributed resource allocations 70. As shown in FIG. 1, each FFR partition 66 has both a localized resource allocation 68 and at least one distributed resource allocation 70. The FFR partition 2 has two distributed resource allocations, distributed resource allocation 1 and distributed resource allocation 2. In some embodiments, different distributed resource allocations may be used to transmit with different pre-coding or beamforming patterns, or with a different number of MIMO streams.

In some embodiments, each localized resource allocation 68 includes one or more dedicated, pre-coded pilot sub-carriers 32. For localized resource allocations 68, there are one or more pilot sub-carriers sets 32 with potentially different overhead to support different MIMO ranks and to support single-user/multiple-user (SU/MU) MIMO (in the case of MU MIMO with a single stream per user, each user uses one data stream and one pilot stream. A pilot stream is a set of pilots intended for channel estimation from a single transmit antenna. In some embodiments, the localized resource allocations 68 support MU MIMO with the overhead of a single pilot stream by overlaying the pilot sub-carriers 32 (as in code division multiplexing), assuming there is low cross-talk. For example, when transmitting to two AMSs 40 by the ABS 30 over a resource unit 44, the data intended for each AMS i (where I=1, 2, . . . ) is modulated by a different pre-coding matrix, $F_i$, that is, beamformed, over the transmit antennas of the ABS. A single set of pilot sub-carriers 32 is used for the two or more transmissions, where the pilot values, $v_k$, (where k denotes the location of the pilot sub-carrier) are a sum of fixed sequences, $p_{i,k}$, each multiplied by the pre-coding matrix intended for one AMS, as follows:

$$v_k = \sum_{i=1}^{\#users} p_{i,k} \cdot F_i$$

Each of the AMSs 40 correlates the pilot sub-carriers 32 with the fixed sequence intended for it ($p_{i,k}$) and then estimates the effective channel (which is the physical propagation channel multiplied by the pre-coding matrix, $F_i$).

In some embodiments, each distributed resource allocation 70 is a subset of the remaining resource units 44 after removal of the localized resource allocations 68. The diversity resources (bursts) are interleaved over the FFR partition 66, where the resource units are spread by pseudo-random order over the resource units in frequency and time. For example, if there are five resource units 44 in the distributed resource allocation 70, then five distributed LRUs 90 are scattered over the five resource units. For the distributed resource allocations 70, the pilot sub-carriers 32 are dedicated to the FFR partition 66 and shared between all AMSs 40, although there may be just a single AMS.

In some embodiments, the downlink subchannelization method 100 is based on a six-symbol sub-frame, which is widely accepted in the 802.16m standard. The downlink subchannelization method 100 supports different modes in the same sub-frame. Additionally, in some embodiments, the downlink subchannelization method 100 supports:

both localized and distributed sub-carriers
different modulation modes (MIMO, fixed/adaptive beamforming, MU-MIMO)
different FFR partitions (reuse factors, powers, etc.).

In WiMAX-I, each combination of MIMO order, beamforming and reuse factor, requires a different zone. In contrast, the downlink subchannelization method 100 unites the features to reduce fragmentation and includes a comprehensive solution to multiple modes. The subchannelization method 100 has an optimized design for FFR and pre-coded-MIMO (MU or SU). Some of these modes are new in 802.16m, and the downlink subchannelization method 100 is implemented with these special designs in mind. Further, the method 100 uses dedicated and pre-coded pilots for demodulation which is advantageous for FFR and precoding/beamforming, and non-pre-coded pilots (known as "sounding" or "midamble" pilots) are sent infrequently. In some embodiments, the non-pre-coded pilots are sent one to two times per frame for closed-loop MIMO feedback. The downlink subchannelization method 100 supports one, two, three, or four streams with one, two, or four pilot streams. Since in the proposed method 100, the pilot sub-carriers 32 are not shared between FFR partitions 66, the pilots form an integral part of the group and are boosted together with the data sub-carriers 34 of the FFR partition. Therefore, the interference level on the pilots 32 has an approximately fixed ratio with the interference level on the data sub-carriers 34, which guarantees sufficient channel estimation performance, in some embodiments.

The downlink subchannelization method 100 supports FFR partitions 66 with localized and diversity allocations. The number and size of FFR partitions 66 is configurable in the system (reported, for example, in the broadcast control channel, BCCH). Each FFR partition 66 may have different power, and potentially, FFR partitions may have other attributes to help interference mitigation. For example, the FFR partitions 66 may be restricted to low modulation and space time block coding (STBC), the number of streams may be restricted to one or two, and the FFR partitions may have attributes intended for scheduling (e.g., price). This information may be shared with AMSs (users) on a slow update basis. The FFR partitions 66 are distributed in frequency and interleaved with one another, similar to PUSC major groups, in order to yield diversity gain (high mobility) and scheduling gain (low mobility).

In some embodiments, the downlink subchannelization method 100 is preferred over prior art subchannelization schemes because of its hierarchical order of allocation. As explained above, the subchannelization method 100 distributes resources (LRUs 90) to groups that are synchronized between cells 80, such as the FFR partitions 66. From this distribution, each partition 66 is sub-divided in a cell-specific manner into distributed 70 and localized 68 groups.

Figure 5:
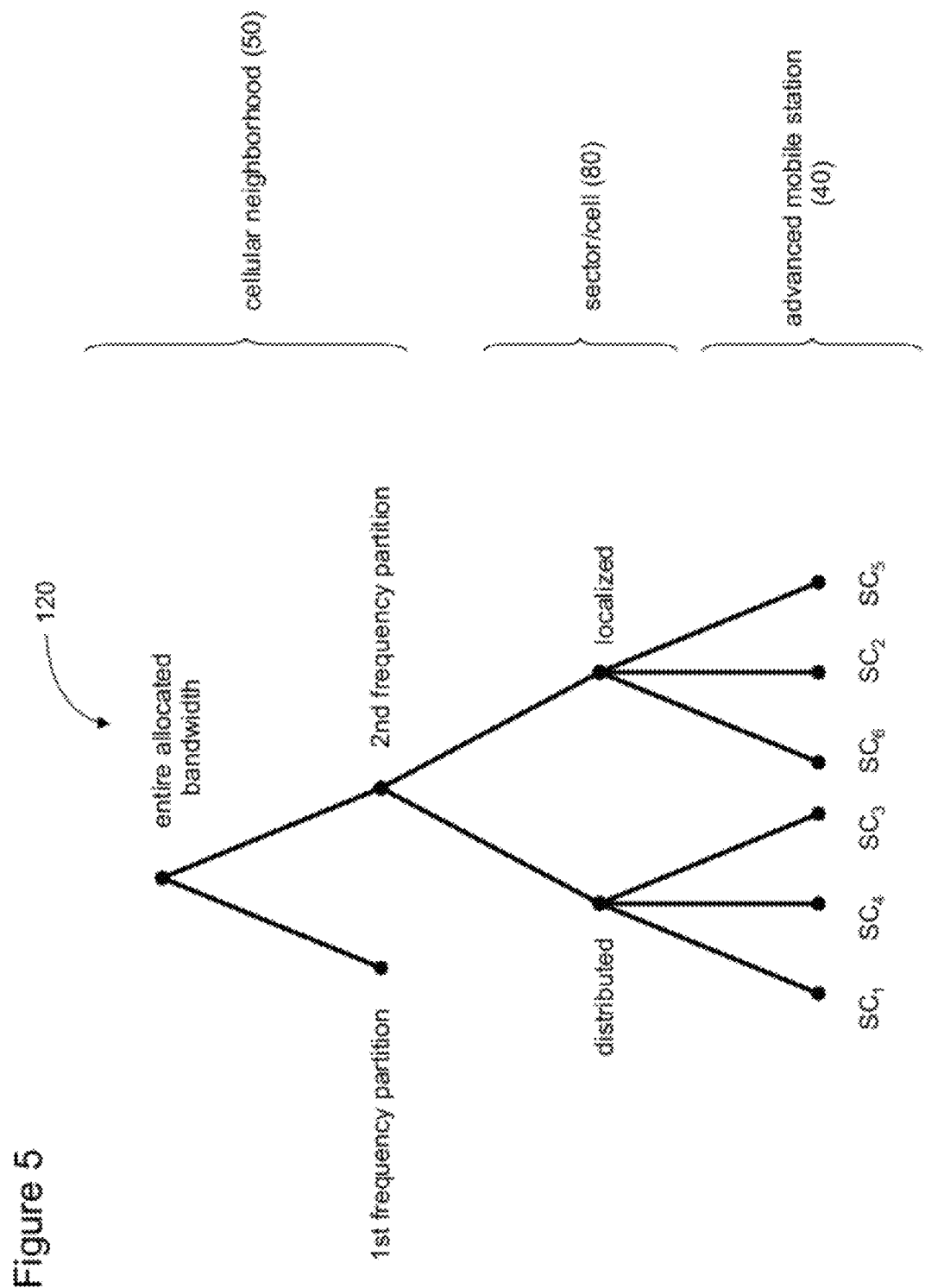
FIG. 5 is a diagram showing the hierarchical order of allocation performed by the subchannelization method of FIG. 1, according to some embodiments.

FIG. 5 illustrates this hierarchical model 120, according to some embodiments. The subchannelization method 100 takes the entire allocated bandwidth (physical frequency 60 in FIG. 1) and divides it up into multiple frequency partitions, such as the FFR partitions 66 described above. The method 100 then divides each partition into both distributed and localized resource allocations, from which LRUs 90 are allocated. The allocated bandwidth and partitions are available to all in the cellular neighborhood 50 (or some portion thereof). The localized and distributed resource allocations 68, 70 are designated only to the relevant cells 80, with other cells 80 seeing possibly different localized and distributed resource allocations. Finally, the LRUs 90 are designated to the users, the AMSs 40. For example, the LRUs associated with the localized resource allocation, denoted in FIG. 5 as $SC_6$, $SC_2$, and $SC_5$, may be assigned to a first set of AMSs while the LRUs associated with the distributed resource allocation, denoted $SC_1$, $SC_4$, and $SC_3$, may be assigned to a second set of AMSs. The AMSs 40 will indicate a LRU preference to the ABS 30, but the ABS will ultimately make the selection. The AMSs 40 do not need to know the LRU allocations of other users. However, in some embodiments, the AMSs 40 are aware of the hierarchy 120, as the hierarchy enables each AMS to mimic its process, that is, breaking up the symbol into FFR partitions, localized/distributed resource allocations, LRUs, and so on, so that the AMS may find its appropriate LRU.

Further, in contrast to prior art subchannelization schemes, the downlink subchannelization method 100 supports localized and distributed resource allocations concurrently. Finally, the pilot sub-carriers 32, along with the data sub-carriers 34, are included in the localized and distributed resource allocations generated by the subchannelization method 100. Advantageously, pilot sub-carriers 32 experience the same interference environment as the data sub-carriers 34 surrounding the pilots. Thus, it makes sense to group the pilot sub-carriers 32 with the data sub-carriers 34. In LTE (long-term evolution) systems, the pilot sub-carriers 32 are common to all groups. Thus, a pilot sub-carrier may have "reuse 1" while the data sub-carriers have "reuse 3". With this implementation, there is no direct relationship between the signal-to-interference-plus-noise ratios (SINR) on the data sub-carriers and the SINR on the pilot sub-carriers. Further, there may be a situation in which the AMS 40 performance is limited, not because of the SINR on the data sub-carriers, but because of bad SINR on the pilot sub-carriers 32.

While the application has been described with respect to a limited number of embodiments, those skilled in the art will appreciate numerous modifications and variations therefrom. It is intended that the appended claims cover all such modifications and variations as fall within the true spirit and scope of the invention.

I claim:

1. A subchannelization method comprising:
partitioning an allocated bandwidth, by an advanced base station in a cellular neighborhood, into a plurality of orthogonal fractional frequency reuse partitions, wherein each fractional frequency reuse partition comprises data sub-carriers and pilot sub-carriers;
sub-dividing one of the plurality of orthogonal fractional frequency reuse partitions into a first distributed resource allocation, the first distributed resource allocation comprising one or more resource units of pseudo-randomly distributed sub-carriers of the allocated bandwidth;
further sub-dividing the one of the plurality of orthogonal fractional frequency reuse partitions into a localized resource allocation, the localized resource allocation comprising one or more resource units of contiguous sub-carriers of the allocated bandwidth, each resource unit comprising at least one pilot sub-carrier modulated with pilot values and at least one data sub-carrier modulated with data, wherein the localized resource allocation comprises at least one pilot sub-carrier; and
transmitting, by the advanced base station, over a resource unit simultaneously to a first advanced mobile station and a second advanced mobile station using a single set of pilot sub-carriers by:
modulating data intended for a first advanced mobile station by a first precoding matrix; and
modulating data intended for a second advanced mobile station by a second precoding matrix;
wherein the pilot values, $v_k$, are a sum of fixed sequences, $p_{i,k}$, each fixed sequence being multiplied by the precoding matrix intended for its respective advanced mobile station, given by:

$$v_k = \sum_{i=1}^{\#users} p_{i,k} \cdot F_i$$

where k denotes a location of the pilot sub-carrier and i is a positive integer.

2. The subchannelization method of claim 1, further comprising:
partitioning the allocated bandwidth into at least two orthogonal fractional frequency reuse partitions of variable size;
sub-dividing one or more partitions of logical resource units from one of the fractional frequency reuse partitions; and
allocating a logical resource unit from each partition to the advanced mobile station for communication in the cellular neighborhood.

3. The subchannelization method of claim 1, further comprising:
dividing the allocated bandwidth into a plurality of miniBands, each miniBand comprising a minimal portion of adjacent physical resource units to be allocated to the fractional frequency reuse partition, wherein each miniBand comprises at least one resource unit;
permuting the miniBands into logical miniBands; and
distributing the logical miniBands to the fractional frequency reuse partition.

4. The subchannelization method of claim 3, further comprising:
broadcasting a fractional frequency reuse list to a cell in the cellular neighborhood, the cell comprising the advanced mobile station, the fractional frequency reuse list identifying the number and size, in miniBands, of the fractional frequency reuse partition.

5. The subchannelization method of claim 1, further comprising:
allocating transmission for two or more advanced mobile stations over a resource unit, wherein the data intended for each advanced mobile station is modulated by a different pre-coding matrix over transmit antennas; and
using a single set of pilot sub-carriers for the two or more transmissions, the pilot sub-carriers to be modulated by pilot values, wherein the pilot values comprise a sum of two or more fixed sequences each multiplied by the pre-coder matrix intended for one advanced mobile station.

6. The subchannelization method of claim 1, sub-dividing the fractional frequency reuse partition into a first distributed resource allocation further comprising:
using fewer resource units to sub-divide the fractional frequency reuse partition into the first distributed resource allocation than were used for the localized resource allocation.

7. The subchannelization method of claim 1, further comprising:
sub-dividing the fractional frequency reuse partition into a second distributed resource allocation, the second distributed resource allocation comprising one or more resource units of pseudo-randomly distributed sub-carriers of the allocated bandwidth, wherein the second distributed resource allocation is a subset of resource units remaining after the localized resource allocation and the first distributed resource allocation are generated.

8. The subchannelization method of claim 6, further comprising:
applying a first beamforming pattern to the first distributed resource allocation; and
applying a second beamforming pattern to the second distributed resource allocation;
wherein the first beamforming pattern is different from the second beamforming pattern.

9. The subchannelization method of claim 7, further comprising:
applying a first number of multiple-input-multiple-output streams to the first distributed resource allocation; and
applying a second number of multiple-input-multiple-output streams to the second distributed resource allocation;
wherein the first number is not equal to the second number.

10. The subchannelization method of claim 1, further comprising:
interleaving the sub-carriers in the first distributed resource allocation; and
allocating sub-carriers from the first distributed resource allocation to one or more distributed logical resource units;
wherein the number of resource units in the fractional frequency reuse partition is equal to the number of localized logical resource units plus the number of distributed logical resource units.

11. A subchannelization method comprising:
partitioning an allocated bandwidth, by an advanced base station in a cellular neighborhood, into a partition of a plurality of partitions, wherein the allocated bandwidth comprises data sub-carriers and pilot sub-carriers;
sub-dividing a localized resource allocation from the partition, the localized resource allocation comprising one or more resource units of contiguous sub-carriers of the allocated bandwidth, each resource unit comprising at least one pilot sub-carrier modulated with pilot values and at least one data sub-carrier modulated with data, wherein the localized resource allocation comprises at least one pilot sub-carrier, the localized resource allocation to be used by a first advanced mobile station;
sub-dividing the partition into a distributed resource allocation, the distributed resource allocation comprising one or more resource units of pseudo-randomly distributed sub-carriers of the allocated bandwidth, wherein the distributed resource allocation comprises at least one second pilot sub-carrier, the distributed resource allocation to be used by a second advanced mobile station, the first and second advanced mobile stations being part of the cellular neighborhood; and
allocating sub-carriers from the localized resource allocation to one or more localized logical resource units, the one or more localized logical resource units being designated to the first advanced mobile station;
wherein the at least one pilot sub-carrier in the localized resource allocation and the at least one second pilot sub-carrier in the distributed resource allocation belong exclusively to the partition
wherein the at least one pilot sub-carrier of the first frequency partition is not shared with the second frequency partition, such that the interference level on the pilot sub-carrier has an approximately fixed ratio with the interference level on the data sub-carrier.

12. The subchannelization method of claim 11, further comprising:
broadcasting a list to a cell in the cellular neighborhood, the cell comprising at least one advanced mobile station, the list identifying the number and size, in miniBands, of the partition.

13. The subchannelization method of claim 11, further comprising:
sub-dividing the localized resource allocation from the partition such that the localized resource allocation comprises a first set of pilot sub-carriers and a second set of pilot sub-carriers, wherein the first and second sets support both single-user and multiple-user multiple-input-multiple-output, including different multiple-input-multiple-output ranks.

14. The subchannelization method of claim 11, sub-dividing the partition into a distributed resource allocation further comprising:
using fewer resource units to sub-divide the partition into the distributed resource allocation than were used for the localized resource allocation.

15. The subchannelization method of claim 11, allocating sub-carriers from the localized resource allocation to one or more localized LRUs further comprising:
allocating all sub-carriers in the one or more resource units of the localized resource allocation to the one or more localized logical resource units.

16. The subchannelization method of claim 11, further comprising:
interleaving the sub-carriers in the distributed resource allocation; and
allocating sub-carriers from the distributed resource allocation to one or more distributed logical resource units;
wherein the number of resource units in the partition is equal to the number of localized logical resource units plus the number of distributed logical resource units.

17. A subchannelization method comprising:
partitioning a physical frequency allocation into a first frequency partition and a second frequency partition by an advanced base station in a cellular neighborhood, wherein the first frequency partition is designated for a first set of advanced mobile stations in the cellular neighborhood and the second frequency partition is designated for a second set of advanced mobile stations in the cellular neighborhood;
sub-dividing the first frequency partition into a localized resource allocation and a distributed resource allocation, the localized and distributed resource allocations each comprising at least one pilot sub-carrier modulated with pilot values and at least one data sub-carrier modulated with data;
assigning the localized resource allocation to a first set of logical resource units, wherein the first set of logical resource units is designated to the first set of advanced mobile stations but not designated to the second set of advanced mobile stations in the cellular neighborhood;
assigning the distributed resource allocation to a second set of logical resource units, wherein the second set of logical resource units is designated to the second set of advanced mobile stations but not designated to the first set of advanced mobile stations; and
further sub-dividing the first frequency partition into a second distributed resource allocation, the second distributed resource allocation comprising at least one pilot sub-carrier and at least one data sub-carrier, the distributed resource allocation having a first beamforming pattern and the second distributed resource allocation having a second beamforming pattern, wherein the first beamforming pattern is different from the second beamforming pattern;
wherein the at least one pilot sub-carrier of the first frequency partition is not shared with the second frequency partition, such that the interference level on the pilot sub-carrier has an approximately fixed ratio with the interference level on the data sub-carrier.

* * * * *